(12) United States Patent
Endo

(10) Patent No.: US 9,132,709 B2
(45) Date of Patent: Sep. 15, 2015

(54) SUSPENSION DEVICE, SUSPENSION SUPPORT, AND BUFFER MEMBER

(71) Applicant: SHOWA CORPORATION, Gyoda-shi (JP)

(72) Inventor: Seiya Endo, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/035,047

(22) Filed: Sep. 24, 2013

(65) Prior Publication Data

US 2014/0291907 A1 Oct. 2, 2014

(30) Foreign Application Priority Data

Mar. 29, 2013 (JP) ................................. 2013-071192

(51) Int. Cl.
*B60G 15/06* (2006.01)
*B60G 13/00* (2006.01)

(52) U.S. Cl.
CPC .............. *B60G 15/06* (2013.01); *B60G 13/003* (2013.01); *B60G 15/067* (2013.01); *B60G 2204/128* (2013.01); *B60G 2204/41* (2013.01)

(58) Field of Classification Search
CPC .. B60G 15/06; B60G 15/067; B60G 2204/41; B60G 2204/128; B06G 13/003
USPC ............. 267/220, 221, 33, 35, 153, 293, 294; 188/322.11, 322.12, 322.22; 280/124.155, 124.145, 124.147

See application file for complete search history.

(56) References Cited

U.S. PATENT DOCUMENTS

| | | | | |
|---|---|---|---|---|
| 4,434,977 A * | 3/1984 | Chiba et al. | ...................... | 267/33 |
| 4,804,169 A * | 2/1989 | Hassan | .......................... | 267/220 |
| 4,828,232 A * | 5/1989 | Harrod et al. | ............... | 267/64.24 |
| 5,775,720 A * | 7/1998 | Kmiec et al. | ............. | 188/322.15 |
| 6,883,651 B2 * | 4/2005 | Fukaya | ....................... | 188/322.12 |
| 7,172,182 B2 * | 2/2007 | Huprikar et al. | ............... | 267/293 |

(Continued)

FOREIGN PATENT DOCUMENTS

| | | |
|---|---|---|
| DE | 19828370 A | 1/2000 |
| JP | 08-085318 A | 4/1996 |

(Continued)

OTHER PUBLICATIONS

Office Action mailed Apr. 23, 2013 for the corresponding Japanese Application No. 2013-071192.

(Continued)

*Primary Examiner* — Thomas J Williams
*Assistant Examiner* — Mariano Sy
(74) *Attorney, Agent, or Firm* — Leason Ellis LLP

(57) ABSTRACT

A suspension device includes a piston rod having a projecting part projecting from one end of a cylinder of a shock absorber to the outside of the cylinder, a lower mount rubber provided in the piston rod, and a cover plate provided in the piston rod and configured to transmit a shock received by the piston rod to the lower mount rubber, the lower mount rubber includes an inner circumferential groove configured to restrict the cover plate from being displaced with respect to the lower mount rubber in a state in which the piston rod is not arranged inside the lower mount rubber and the cover plate and the cover plate is fixed around the projecting part of the piston rod in a state in which the piston rod is arranged inside the cover plate.

8 Claims, 6 Drawing Sheets

(56) References Cited

U.S. PATENT DOCUMENTS

| | | | |
|---|---|---|---|
| 7,347,414 B2* | 3/2008 | Groves | 267/220 |
| 7,350,779 B2* | 4/2008 | Tamura | 267/220 |
| 7,726,451 B2 | 6/2010 | Hammer et al. | |
| 7,938,418 B1* | 5/2011 | Coombs et al. | 280/124.147 |
| 8,113,324 B2 | 2/2012 | Baalmann et al. | |
| 8,534,649 B2* | 9/2013 | Abe et al. | 267/220 |
| 8,668,213 B2* | 3/2014 | Takagi et al. | 280/124.147 |
| 2005/0133322 A1* | 6/2005 | Huprikar et al. | 188/321.11 |
| 2008/0001336 A1 | 1/2008 | Groves | |

FOREIGN PATENT DOCUMENTS

| | | |
|---|---|---|
| JP | 2004-069018 A | 3/2004 |
| JP | 2011-094646 A | 5/2011 |

OTHER PUBLICATIONS

Office Action dated Aug. 7, 2013 for the corresponding Japanese Application No. 2013-071192.

Extended European Search Report mailed Jun. 26, 2014 for the corresponding European Application No. 13185884.7.

* cited by examiner

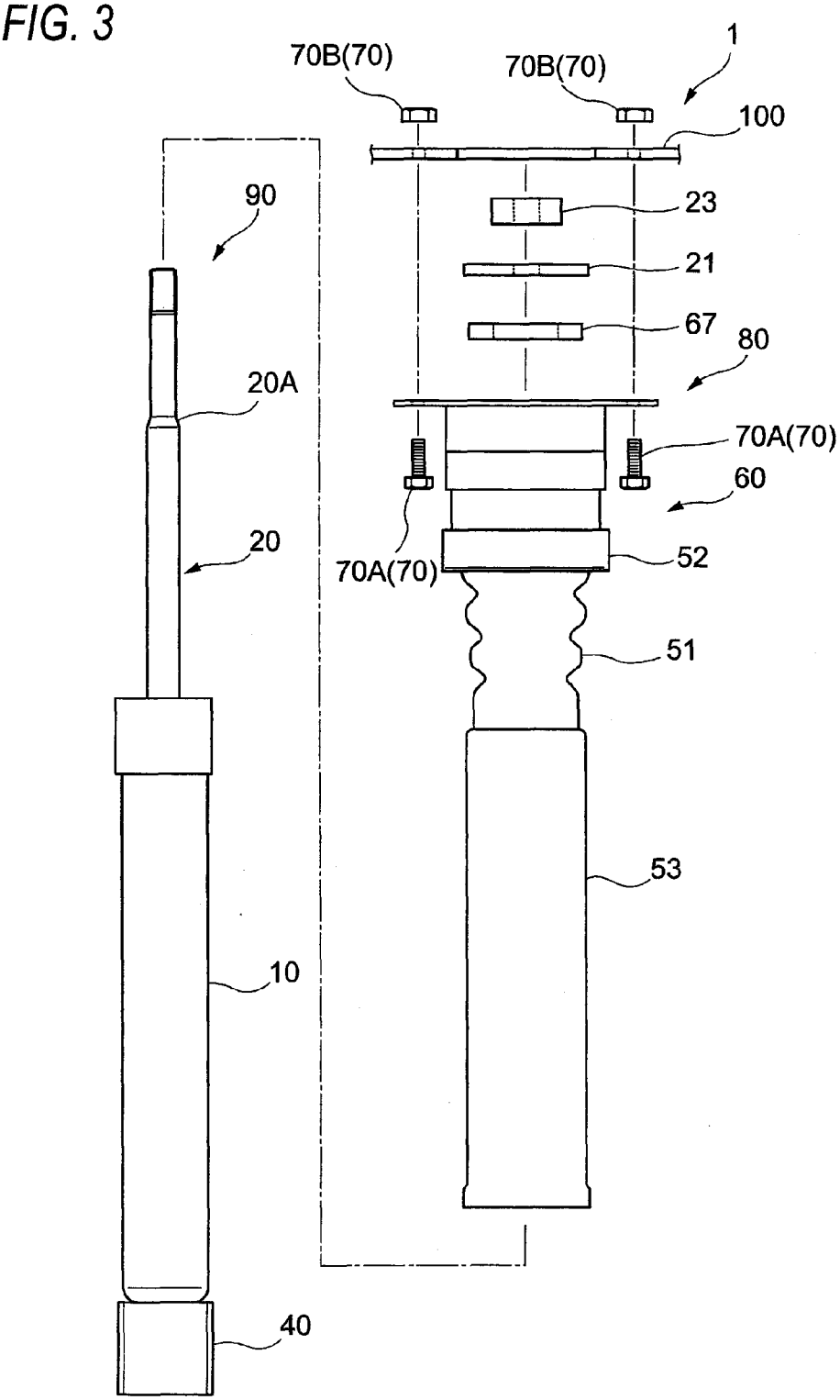

SUSPENSION DEVICE, SUSPENSION SUPPORT, AND BUFFER MEMBER

CROSS-REFERENCE TO RELATED APPLICATIONS

This application is based on and claims priority under 35 U.S.C. 119 from Japanese Patent Application No. 2013-071192 filed on Mar. 29, 2013, the entire content of which is incorporated herein by reference.

BACKGROUND

1. Technical Field

The present invention relates to a suspension device, a suspension support, and a buffer member.

2. Related Art

In a suspension device (a damper), a suspension support is provided around the upper end of a piston rod, which projects from a cylinder, in order to suppress transmission of a vibration (a shock) from a wheel side to a vehicle body side.

For example, a mount structure described in Patent Literature 1 (JP-A-2004-69018) is configured as explained below. A collar is inserted over the outer circumference of the outer end of a piston rod, a pair of upper and lower rubber bushes is inserted over the outer circumference of the collar, and the inner circumferential end of a vehicle body attachment bracket and the outer circumferential end of a retainer for holding the upper rubber bush are inserted and sandwiched between the rubber bushes. An elastic body for preventing the inner circumferential ends of the vehicle body attachment bracket and the retainer from coming into contact with the collar is interposed between the outer circumference of the collar and the respective inner circumferential ends.

For example, a mounting structure described in Patent Literature 2 (JP-A-H8-85318) is configured as explained below. Upper and lower elastic members are attached between supporting members by a nut held by the supporting members and provided at an end of a rod. An annular projection is formed to be swelled in one elastic member of the elastic members, an annular recess is formed in the other elastic member, and the projection of the one elastic member is fitted in the recess of the other elastic member via a through-hole of a bracket.

SUMMARY OF INVENTION

A suspension device can be configured to include, around a piston rod projecting from a cylinder, an elastic member configured to absorb a shock from the piston rod and a transmitting member configured to transmit the shock from the piston rod to the elastic member. When the suspension device is assembled, if the positions of the elastic member and the transmitting member deviate from each other, for example, work for inserting the piston rod into the elastic member and the transmitting member is complicated.

It is an object of the present invention to provide a suspension device and the like in which an elastic member and a transmitting member are suppressed from deviating from each other.

To attain the object, according to an aspect of the present invention, there is provided a suspension device including: a cylinder configured to store fluid therein; a piston configured to divide an inside of the cylinder and arranged to be capable of sliding on the inside of the cylinder; a piston rod configured to support the piston and including a projecting part that projects from one end of the cylinder to an outside of the cylinder; an elastic member provided around the projecting part of the piston rod; a transmitting member provided around the projecting part of the piston rod and configured to hold the elastic member from both sides in an axis direction of the piston rod with a first member provided on the cylinder side with respect to the elastic member and a second member provided on an opposite side of the first member across the elastic member and transmit a shock received by the piston rod to the elastic member; and a supporting member, which is a cylindrical member inserted into the elastic member, configured to support the projecting part of the piston rod, arranged to be held between the first member and the second member in the axis direction to set a distance in the axis direction between the first member and the second member to a predetermined distance, and pressed by the transmitting member when the first member or the second member receives a shock from the piston rod, in which the elastic member and/or the transmitting member includes a restricting mechanism configured to restrict the transmitting member from being displaced with respect to the elastic member in a state in which the piston rod is not arranged inside the elastic member and the transmitting member, and the transmitting member is fixed around the projecting part in the piston rod in a state in which the piston rod is arranged inside the transmitting member.

The suspension device may further include an attachment member attached to a vehicle body side, in which the elastic member includes a first elastic body arranged further on the cylinder side than the attachment member, and a second elastic body provided separately from the first elastic body and provided on an opposite side of the first elastic body across the attachment member.

The restricting mechanism may include a groove provided to extend in a circumferential direction on an inner circumferential surface of the elastic member and configured to hold an outer circumferential section of the first member of the transmitting member.

The supporting member may be separated from an inner circumferential surface of the elastic member in a state in which the supporting member is inserted into the elastic member.

The first member may include, in a center thereof, an insertion hole for inserting the projecting part of the piston rod and is fixed to the piston rod with the insertion hole in a state in which the projecting part is inserted into the insertion hole and the second member is not fixed to the piston rod.

The insertion hole of the first member of the transmitting member may include a taper section, a diameter of which increases toward the piston supported by the piston rod in the axis direction of the piston rod.

According to another aspect of the present invention, there is provided a suspension support including: an elastic member provided around a projecting part of a piston rod, the projecting part projecting from a cylinder of a shock absorber; a transmitting member provided around the projecting part of the piston rod and configured to hold the elastic member from both sides in an axis direction of the piston rod with a first member provided on the cylinder side with respect to the elastic member and a second member provided on an opposite side of the first member across the elastic member and transmit a shock received by the piston rod to the elastic member; and a supporting member, which is a cylindrical member inserted into the elastic member, configured to support the projecting part of the piston rod, arranged to be held between the first member and the second member in the axis direction to set a distance in the axis direction between the first member and the second member to a predetermined distance, and pressed by the transmitting member when the first member or the second member receives a shock from the piston rod, in which the elastic member and/or the transmitting member includes a restricting mechanism configured to restrict the transmitting member from being displaced with respect to the elastic member in a state in which the piston rod is not arranged inside the elastic member and the transmitting member, and the transmitting member is fixed around the projecting part in the piston rod in a state in which the piston rod is arranged inside the transmitting member.

According to still another aspect of the present invention, there is provided a buffer member provided around a projecting part of a piston rod, the projecting part projecting from a cylinder of a shock absorber, in which a shock received by the piston rod is transmitted to the buffer member by a transmitting member provided around the projecting part of the piston rod, the transmitting member is configured to hold the buffer member from both sides in an axis direction of the piston rod with a first member provided on the cylinder side with respect to the buffer member and a second member provided on an opposite side of the first member across the buffer member, the buffer member comprises an insertion hole into which a supporting member is inserted, the supporting member is a cylindrical member and configured to support the projecting part of the piston rod, arranged to be held between the first member and the second member in the axis direction to set a distance in the axis direction between the first member and the second member to a predetermined distance, and pressed by the transmitting member when the first member or the second member receives a shock from the piston rod, and the buffer member includes a restricting mechanism configured to engage with the transmitting member and restrict a change of relative positions of the buffer member and the transmitting member in a state in which the piston rod is not arranged inside the buffer member.

According to the present invention, it is possible to provide a suspension device and the like in which an elastic member and a transmitting member are suppressed from deviating from each other.

BRIEF DESCRIPTION OF DRAWINGS

FIG. 3 is a diagram for explaining a procedure for assembling the suspension device;

DESCRIPTION OF EMBODIMENTS

Figure 1:
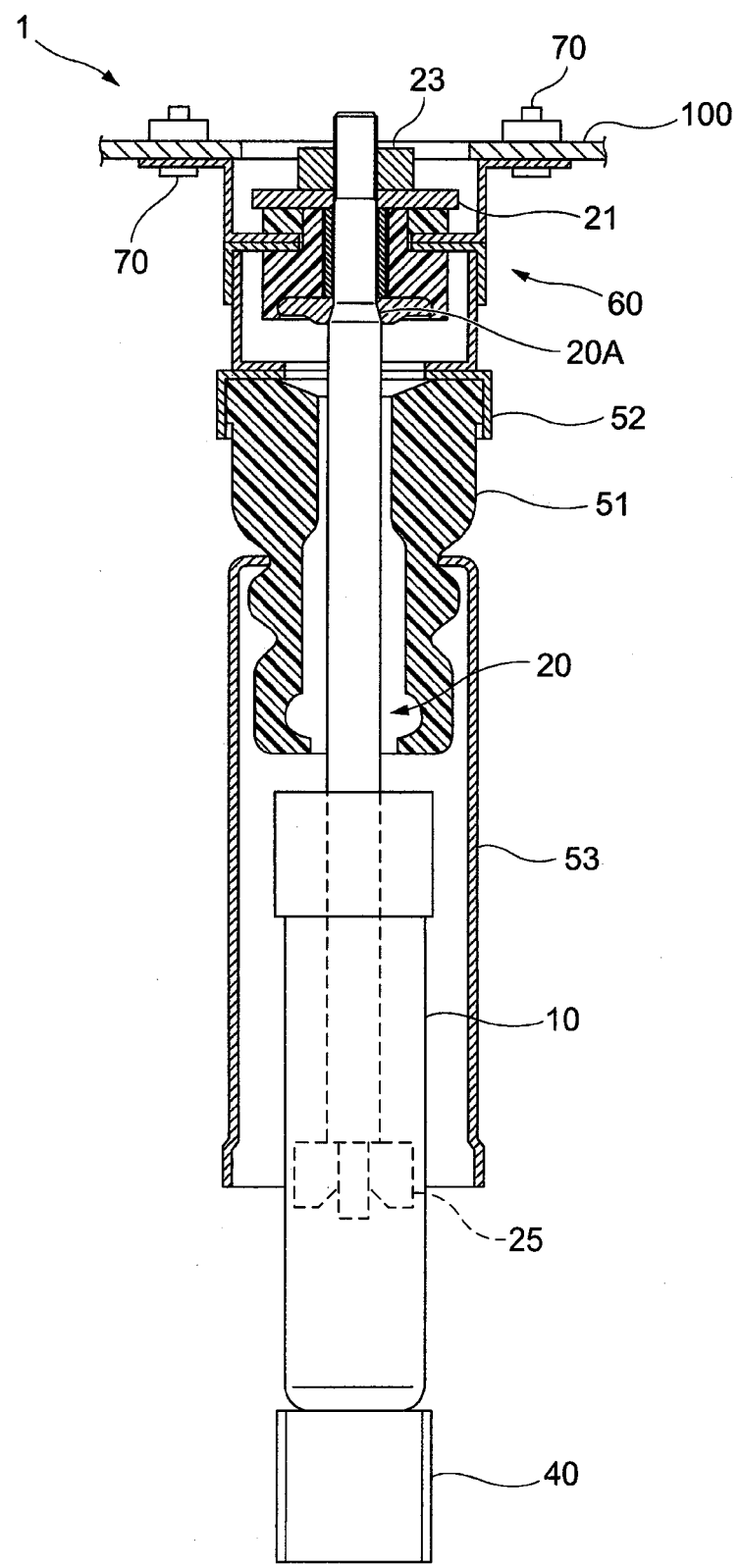
FIG. 1 is a diagram showing a schematic configuration of a suspension device according to an embodiment.

An embodiment of the present invention is explained in detail below with reference to the accompanying drawings.
<Suspension Device 1>
FIG. 1 is a diagram showing a schematic configuration of a suspension device 1 according to this embodiment.

The suspension device 1 includes, as shown in FIG. 1, a cylinder 10 incorporating a damping device (not shown in the figure) and a piston rod 20 configured to support a piston 25 housed in the cylinder 10. The piston rod 20 is a substantially columnar and/or substantially cylindrical member. The piston 25 is attached to one end side in the axis direction of the column or the cylinder. A washer (a transmitting member (a second member)) 21 and a nut 23 are attached to the other end side in the axis direction.

In the piston rod 20, the diameter of the other end in the axis direction (the washer 21 and nut 23 side) is small compared with the diameter of the one end in the axis direction (the piston side). The piston rod 20 includes, on the other end side in the axis direction, a shoulder section (a taper section) 20A, the diameter in the radial direction of which decreases along the axis direction.

In the following explanation, in some cases, the axis direction of the column or the cylinder of the piston rod 20 is simply referred to as "axis direction" and the radial direction of the column of the piston rod 20 is simply referred to as "radial direction".

The suspension device 1 includes a wheel-side attaching section 40 provided under the cylinder 10. The suspension device 1 includes a substantially cylindrical bump rubber 51 arranged in the outer circumference of a part (a projecting part) projecting from the cylinder 10 in the piston rod 20 and a bump rubber cup 52 arranged in the outer circumferential section of the bump rubber 51. The bump rubber (an annular member) 51 not shown in the figure is formed such that the outer diameter thereof gradually decreases from one end side (a vehicle body 100 side) toward the other end side (a wheel side) in the axis direction. The suspension device 1 includes a cover 53, the upper end of which is attached to the outer circumference of the bump rubber 51, configured to cover at least a part of the outer circumferences of the cylinder 10 and the piston rod 20.

The suspension device 1 includes a suspension support 60 arranged on the upper end side of the piston rod 20 and configured to elastically couple the piston rod 20 to the vehicle body 100. The suspension support 60 is fixed to the vehicle body 100 by a fastening member 70.

In the suspension device 1 configured as explained above, when the piston rod 20 moves to one end side (downward in FIG. 1) in the axis direction with respect to the cylinder 10, a damping force during a compression stroke is generated by the damping device (not shown in the figure) incorporated in the cylinder 10.

When the piston rod 20 moves to the other end side (upward in FIG. 1) in the axis direction with respect to the cylinder 10, a damping force during an extension stroke is generated by the damping device (not shown in the figure) incorporated in the cylinder 10.

As explained above, the suspension device 1 performs a function of a buffer device that causes the damping device incorporated in the cylinder 10 to generate a damping force and prevents unevenness of a road surface from being transmitted to the vehicle body 100 while changing between a compressed state and an extended state. The suspension device 1 improves a riding comfort and operation stability of a vehicle.

Figure 2A:
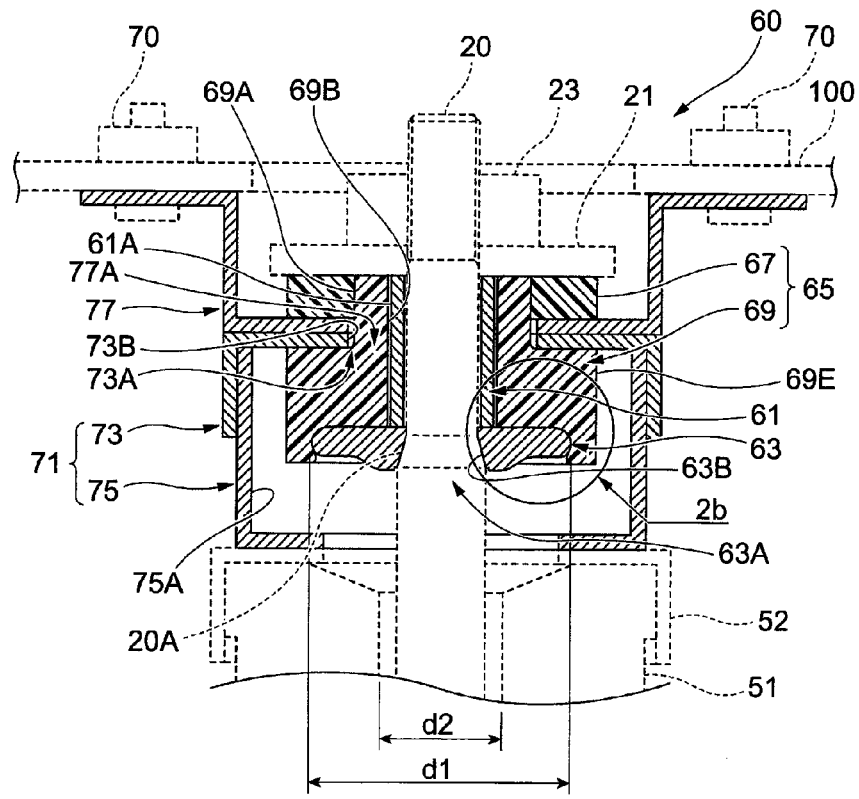
FIGS. 2A and 2B are diagrams for explaining a suspension support.
Figure 2B:
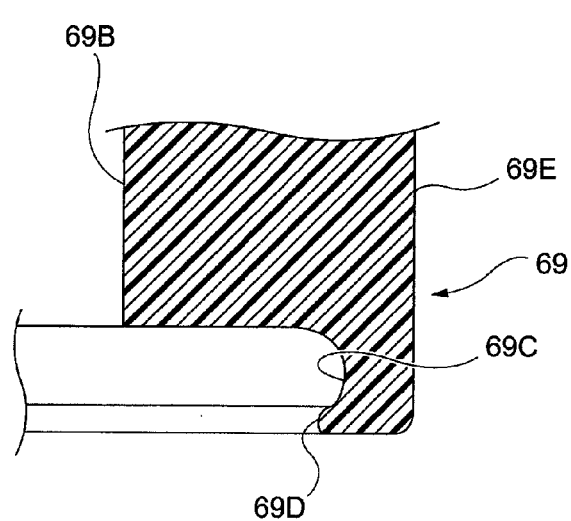

<Suspension Support 60>
FIGS. 2A and 2B are diagrams for explaining the suspension support 60. More specifically, FIG. 2A is a diagram showing a schematic configuration of the suspension support 60 and FIG. 2B is a diagram showing a schematic configuration of a lower mount rubber 69 in a circle 2b shown in FIG. 2A.

As shown in FIGS. 2A and 2B, the suspension support 60 includes a collar 61 provided by being inserted over the upper end side of the piston rod 20 and a cover plate 63 adjacent to, in the axis direction, one end (the wheel side) in the axis direction of the collar 61 and provided by being inserted over the upper end side of the piston rod 20.

The suspension support 60 is an annular elastic member and includes a mount rubber (a buffer member, an elastic member) 65 fixed while surrounding the outer circumferences of the collar 61 and the cover plate 63. The mount rubber 65 includes an upper mount rubber (an elastic member (a second elastic body)) 67 and a lower mount rubber (an elastic member (a first elastic body)) 69 configured to sandwich an upper bracket 73 (explained below) and a vehicle body attachment bracket 77 (explained below) in the axis direction.

The mount rubber 65 is fixed with one end side (the upper side in FIG. 2A) in the axis direction sandwiched by the washer 21 and the nut 23 and the other end side (the lower side in FIG. 2A) sandwiched by the cover plate 63 fitted in the piston rod 20 as explained below. The mount rubber 65 including a plurality of (two) members (the upper mount rubber 67 and the lower mount rubber 69) is explained herein. However, naturally, the mount rubber 65 may be configured by a single member.

The suspension support 60 includes a bracket 71 configured to surround the outer circumference of one end (the lower end in FIGS. 2A and 2B) in the axis direction of the lower mount rubber 69. The bracket 71 includes an upper bracket (an attachment member) 73 provided on the vehicle body 100 side and a lower bracket 75 provided on the wheel side.

In the example shown in the figure, the suspension support 60 includes the vehicle body attachment bracket 77 for attaching the suspension support 60 to the vehicle body 100. The vehicle body attachment bracket 77 is a bowl-like member opened upward. A center hole 77A for inserting a small diameter section 69A of the lower mount rubber 69 is formed in the center of the vehicle body attachment bracket 77.

The suspension support 60 shown in the figure is provided with the axis of the piston rod 20 set in the up down direction.

The collar (a supporting member) 61 is a substantially cylindrical member and supports the upper end of the piston rod 20 inserted into the collar 61. When the nut 23 is tightened to the piston rod 20, the collar 61 sets (regulates) a distance in the axis direction between the washer 21 and the cover plate 63. Consequently, the collar 61 sets a compression ratio in the axis direction of the mount rubber 65 sandwiched between the washer 21 and the cover plate 63.

The cover plate (a transmitting member (a first member)) 63 is a substantially disc-like member. A center hole (an insertion hole) 63A for inserting the upper end side of the piston rod 20 is formed in the center of the disc. In the center hole 63A, a taper section 63B, the diameter of which increases toward the wheel side (the cylinder side) in the axis direction, is formed. As explained in detail below, the shoulder section 20A of the piston rod 20 is fitted with the taper section 6313 of the center hole 63A, whereby the piston rod 20 is fixed to the cover plate 63. The cover plate 63 transmits, to a wider range (area) of the mount rubber 65, a shock received by the piston rod 20 in a direction in which the piston rod 20 projects from the cylinder 10.

An outer diameter d1 of the cover plate 63 is larger than an inner diameter d2 of the bump rubber 51.

In the example shown in the figure, the upper mount rubber 67 and the lower mount rubber 69 are respectively substantially cylindrical members. In the lower mount rubber 69, the small diameter section 69A, the diameter of the other end of which is small compared with one end in the axis direction, is formed.

As shown in FIG. 2A, the small diameter section 69A of the lower mount rubber 69 is inserted into the upper mount rubber 67. The collar 61 and the cover plate 63 are inserted into the lower mount rubber 69.

As shown in FIG. 2B, an annular inner circumferential groove 69C extending in the circumferential direction is formed on an inner circumferential surface 69B on one end side (the wheel side and the lower end) in the axis direction of the lower mount rubber 69. The inner circumferential groove 69C, which is an example of a restricting mechanism, has a sectional shape corresponding to the cover plate 63 to hold the outer circumferential section of the cover plate 63 (see FIG. 2A). The cover plate 63 is arranged in the inner circumferential groove 69C. Further, the outer circumferential section of the cover plate 63 is fitted in the inner circumferential groove 69C, whereby the movement of the cover plate 63 with respect to the lower mount rubber 69 is suppressed in the axis direction and the radial direction.

In the example shown in the figure, the lower mount rubber 69 can be grasped as being configured to include a projecting section 69D configured to project to the inner side in the radial direction from the surface of the inner circumferential groove 69C formed to extend along the outer circumferential section of the cover plate 63 and restrict the movement of the cover plate 63.

The lower bracket 75 is a bowl-like member opened upward. The upper bracket 73 is a member that covers the opening on the upper surface of the lower bracket 75. In the example shown in the figure, in the upper bracket 73, a center hole 73A for inserting the small diameter section 69A of the lower mount rubber 69 is formed in the center. The upper bracket 73 and the lower bracket 75 are, for example, members of metal formed by pressing.

In a state in which the upper bracket 73 and the lower bracket 75 sandwich the lower mount rubber 69, the lower bracket 75 is fitted in the upper bracket 73, whereby one end (the lower end in FIG. 2A) in the axis direction of the lower mount rubber 69 is housed in the bracket 71 (the upper bracket 73 and the lower bracket 75). At this point, the small diameter section 69A of the lower mount rubber 69 housed in the bracket 71 projects from the center hole 73A of the upper bracket 73.

The lower mount rubber 69 is arranged to form a gap between the lower mount rubber 69 and another member to secure a space that is elastically deformed when a shock transmitted from the piston rod 20 is received. Specifically, the inner circumferential surface 69B of the lower mount rubber 69 is arranged spaced apart from an outer circumferential surface 61A of the collar 61. An outer circumferential surface 69E of the lower mount rubber 69 is arranged spaced apart from an inner circumferential surface 73B of the center hole 73A of the upper bracket 73. The outer circumferential surface 69E of the lower mount rubber 69 is arranged spaced apart from an inner circumferential surface 75A of the lower bracket 75.

Since the inner circumferential surface 69B of the lower mount rubber 69 is spaced apart from the outer circumferential surface 61A of the collar 61 as explained above, the collar 61 is movable in the axis direction (in the up down direction in FIG. 2A). On the other hand, as explained above, the cover plate 63 fitted in the inner circumferential groove 69C of the lower mount rubber 69 is restricted from moving in the axis direction. The cover plate 63 is provided adjacent to the collar 61 in the axis direction. Therefore, the lower mount rubber 69 can be grasped as suppressing the movement in the axis direction of the collar 61.

<Assembly of the Suspension Device 1>

Figure 4:
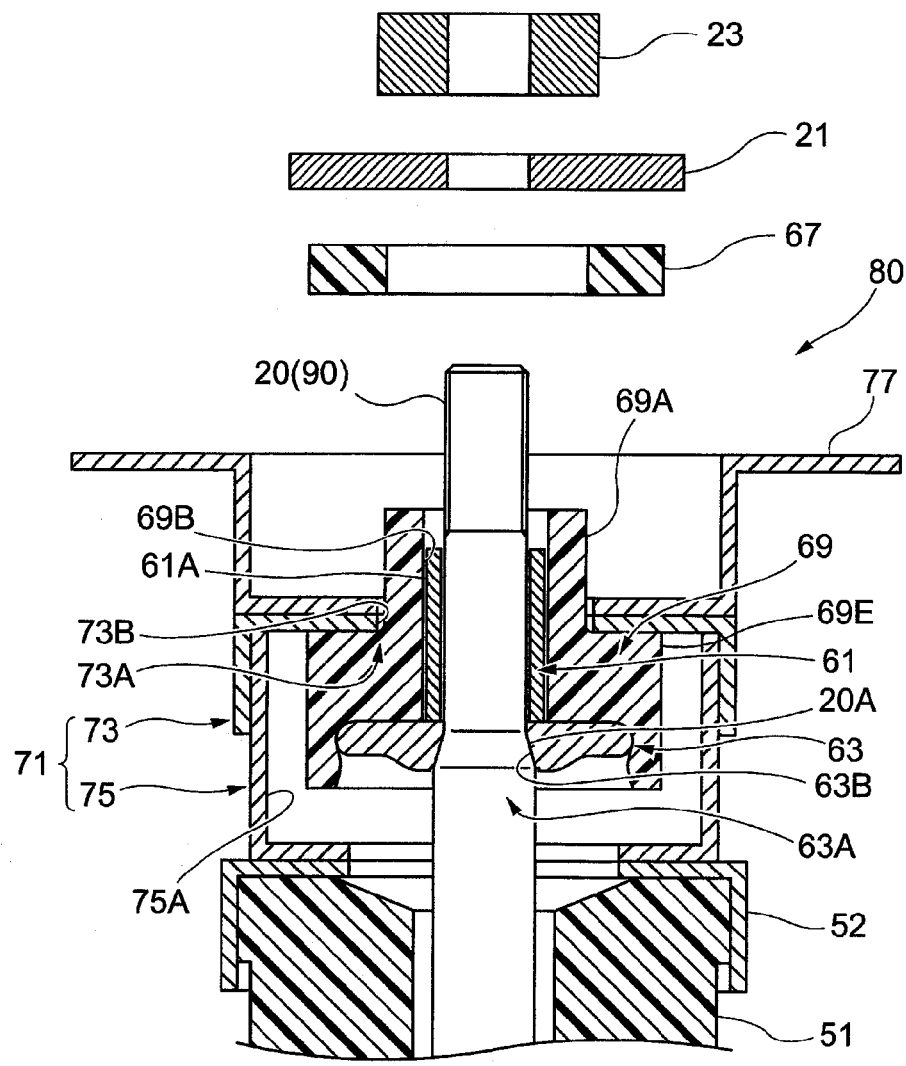
FIG. 4 is a diagram showing a state in which a piston rod is inserted into an armor assembly.

A procedure for assembling the suspension device 1 is explained with reference to FIGS. 2A to 4. FIG. 3 is a diagram for explaining the procedure for assembling the suspension device 1. FIG. 4 is a diagram showing a state in which the piston rod 20 is inserted into an armor assembly 80.

When the suspension device 1 is assembled, first, the suspension support 60 shown in FIG. 2A is assembled. Specifically, the upper bracket 73 and the lower bracket 75 are separately formed by pressing.

The vehicle body attachment bracket 77, which is separately formed, is fixed to the upper bracket 73. Specifically, the vehicle body attachment bracket 77 is fixed by well-known means such as an adhesive or welding while the center hole 73A of the upper bracket 73 and the center hole 77A of the vehicle body attachment bracket 77 are aligned. Similarly, the bump rubber cup 52, which is separately formed, is fixed to the lower bracket 75.

The small diameter section 69A of the lower mount rubber 69 is inserted into the center hole 73A of the upper bracket 73 and the center hole 77A of the vehicle body attachment bracket 77.

Subsequently, the collar 61 is inserted into the lower mount rubber 69, the cover plate 63 is fitted in the inner circumferential groove 69C of the lower mount rubber 69, and the lower bracket 75 is fitted (pressed) in the upper bracket 73. Consequently, the suspension support 60 excluding the upper mount rubber 67 is assembled.

Subsequently, the bump rubber 51 is fitted (pressed) in the bump rubber cup 52 and the cover 53 is fixed to the outer circumference of the bump rubber 51. An assembly including the suspension support 60 (excluding the upper mount rubber 67), the bump rubber 51, the bump rubber cup 52, and the cover 53 assembled as explained above is the armor assembly 80 (see FIG. 3).

Subsequently, as shown in FIG. 3, a piston assembly 90 including the cylinder 10, the piston rod 20, and the wheel-side attaching section 40 is assembled. The assembled piston assembly 90 is inserted into the armor assembly 80. The small diameter section 69A of the lower mount rubber 69 projecting from the bracket 71 and the vehicle body attachment bracket 77 is inserted into the upper mount rubber 67. Further, the washer 21 and the nut 23 are fixed to the piston rod 20 that pierces through the armor assembly 80. Consequently, the suspension device 1 is assembled.

The suspension device 1 is fixed to the vehicle body 100 via the fastening member 70 including a bolt 70a and a nut 70B.

As shown in FIG. 4, according to the insertion of the piston assembly 90 into the armor assembly 80, the piston rod 20 of the piston assembly 90 is inserted into the cover plate 63. The shoulder section 20A is fitted in the taper section 63B of the cover plate 63, whereby the inserted piston rod 20 is held by the cover plate 63.

Consequently, for example, after the piston rod 20 of the piston assembly 90 is inserted into the armor assembly 80, when the upper mount rubber 67, the washer 21, and the nut 23 are attached, the piston rod 20 (the piston assembly 90) is suppressed from coming off the armor assembly 80. Therefore, assembly work can be facilitated.

In the above explanation, the piston rod 20 is fitted in the cover plate 63, whereby the piston rod 20 and the cover plate 63 are fixed. However, naturally, the piston rod 20 and the cover plate 63 may be fixed by a form such as welding or bonding.

COMPARATIVE EXAMPLE

Figure 5:
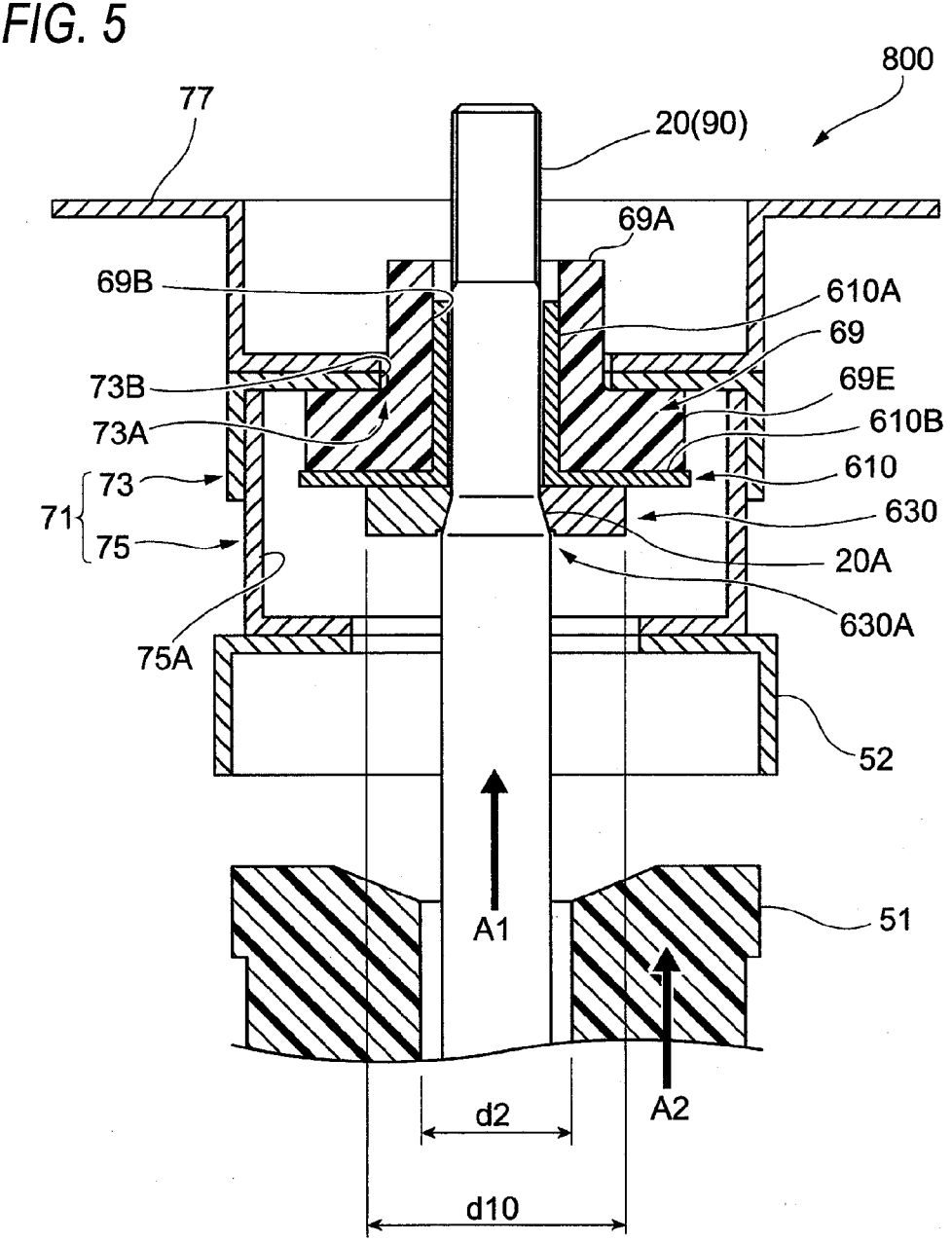
FIG. 5 is a diagram showing a schematic configuration of an armor assembly in a comparative example different from the embodiment.

Assembly work for the suspension device 1 in this embodiment is explained in comparison with an example different from this embodiment with reference to FIGS. 4 and 5. FIG. 5 is a diagram showing a schematic configuration of an armor assembly 800 in a comparative example different from this embodiment.

In the comparative example shown in FIG. 5, unlike this embodiment, a collar plate 610 provided by being inserted over the upper end side of the piston rod 20 and a push-in plate 630 arranged in the shoulder section 20A of the piston rod 20 are respectively provided as separate bodies.

In the collar plate 610, a cylindrical section 610A, which is a substantially cylindrical portion, and a disc section 610B, which is a substantially disc-like portion, coaxial with the cylindrical section 610A and continuous to the cylindrical section 610A in the axis direction are integrally formed. In the example shown in the figure, the outer diameter of the cylindrical section 610A of the collar plate 610 is formed larger than the inner diameter of the lower mount rubber 69 not applied with tension. Consequently, when the collar plate 610 is fitted, the lower mount rubber 69 is compressed.

The push-in plate 630 is a substantially disc-like member. A center hole 630A for inserting the upper end side of the piston rod 20 is formed in the center of the disc. An outer diameter d10 of the push-in plate 630 is larger than an inner diameter d2 of the bump rubber 51.

Insertion of the piston rod 20 of the piston assembly 90 into the armor assembly 800 shown in FIG. 5 is explained.

In the example shown in FIG. 5, the collar plate 610 and the push-in plate 630 are respectively formed as separate bodies and are not configured to fix each other. Therefore, in a state in which the piston rod 20 is not inserted, the collar plate 610 and the push-in plate 630 cannot be centered. Relative positions of the collar plate 610 and the push-in plate 630 could deviate from each other (misalignment could occur). Therefore, when the assembly work is performed in the example shown in FIG. 5, it is conceivable to insert the piston rod 20 into the collar plate 610 in a state in which the piston rod 20 is assembled to the push-in plate 630 in advance.

On the other hand, since the outer diameter d10 of the push-in plate 630 is larger than the inner diameter d2 of the bump rubber 51, the piston rod 20 assembled with the push-in plate 630 in advance cannot be inserted into the bump rubber 51.

Therefore, in the example shown in the figure, first, the collar plate 610 is inserted (pressed) into the lower mount rubber 69 arranged in the upper bracket 73 and the lower bracket 75 is fitted in the upper bracket 73. The bump rubber cup 52 is fixed to the lower bracket 75 in advance by well-known means such as an adhesive or welding.

The bump rubber 51 is inserted over the piston rod 20 in advance and the push-in plate 630 is assembled to the piston rod 20. Subsequently, the piston rod 20 is inserted into the collar plate 610 (see an arrow A1 in the figure). The bump rubber 51 inserted over the piston rod 20 in advance is fitted in the bump rubber cup 52 (see an arrow A2 in the figure).

In this way, in the example shown in the figure, after inserting the piston rod 20 into the collar plate 610 and the push-in plate 630, it is necessary to fit the bump rubber 51 in the bump rubber cup 52.

As explained with reference to FIG. 4 and the like, in this embodiment, the piston assembly 90 is inserted into the armor assembly 80 as explained above. In other words, in a state in which the bump rubber 51 is attached to the bump rubber cup 52, the piston rod 20 of the piston assembly 90 can be inserted into the armor assembly 80.

Therefore, in this embodiment, compared with the example shown in FIG. 5, an assembly process can be further simplified. Further, in this embodiment, compared with the example shown in FIG. 5, manufacturing costs of the suspension device 1 can be reduced.

In this embodiment, unlike the configuration in which the collar plate 610 and the push-in plate 630 are used shown in FIG. 5, the suspension device 1 includes the collar 61, which is a substantially cylindrical member, and the cover plate 63, which is a substantially disc-like member. Therefore, the configuration is simplified.

Further, when the collar plate 610 including the cylindrical section 610A and the disc section 610B shown in FIG. 5 and the collar 61 and the cover plate 63 configured as separate bodies shown in FIG. 4 and the like are compared, the collar 61 and the cover plate 63 are more simple in the configuration and easily manufactured.

<Modification>

Figure 6A:
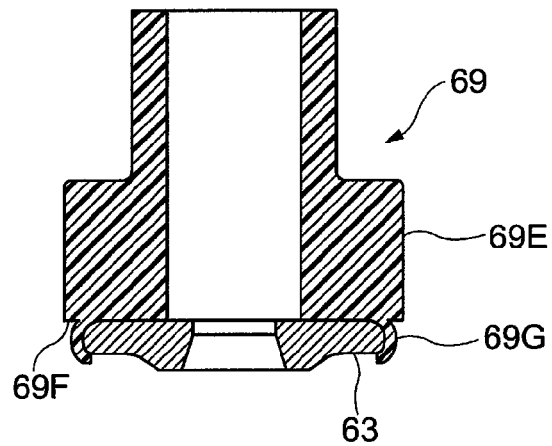
FIGS. 6A to 6C are diagrams showing a schematic configuration of a modification of a lower mount rubber and a cover plate.
Figure 6B:
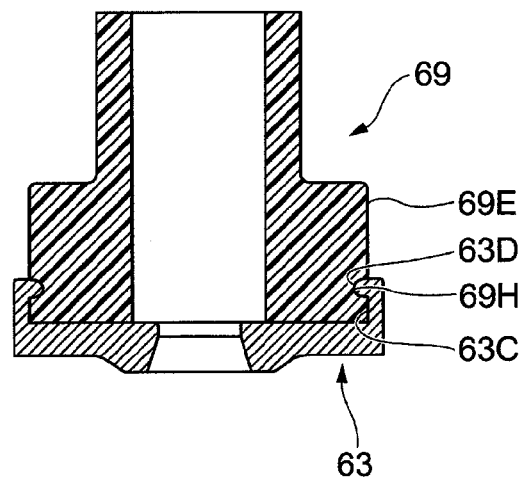
Figure 6C:
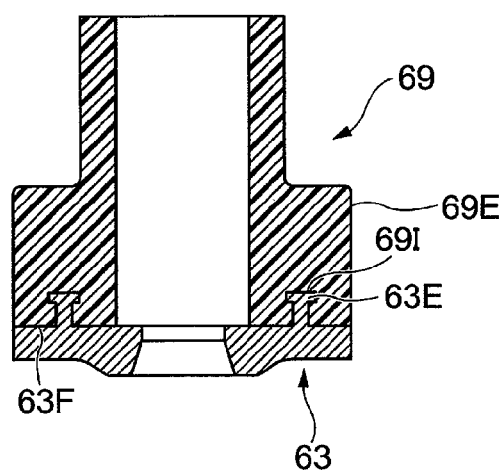

A modification of the lower mount rubber 69 and the cover plate 63 is explained with reference to FIGS. 6A to 6C. FIGS. 6A to 6C are diagrams showing a schematic configuration of the modification of the lower mount rubber 69 and the cover plate 63.

In the above explanation, the lower mount rubber 69 in which the inner circumferential groove 69C is formed is explained with reference to FIGS. 2A and 2B and the like. However, the lower mount rubber 69 may have a form different from the example shown in the figures as long as the lower mount rubber 69 and the cover plate 63 engage with each other and the lower mount rubber 69 and the cover plate 63 are suppressed from deviating from each other.

For example, as shown in FIG. 6A, the lower mount rubber 69 may include, on an end face 69F on the wheel side, a claw-like holding section 69G configured to hold the cover plate 63. Further, a plurality of holding sections 69G may be provided in the circumferential direction on the end face 69F of the lower mount rubber 69.

Alternatively, as shown in FIG. 6B, the cover plate 63 may include a projecting section 63D configured to hold the lower mount rubber 69. More specifically, the cover plate 63 is configured as a bowl-like member having a diameter larger than the diameter of the lower mount rubber 69. The cover plate 63 includes a projecting section 63D projecting from the inner circumferential surface 63C to the inner side in the radial direction. In the example shown in the figure, the lower mount rubber 69 includes, on the outer circumferential surface 69E, a receiving section 69H, which is a recess, configured to receive the projecting section 63D of the cover plate 63.

Further, as shown in FIG. 6C, the cover plate 63 may include a projecting section 63E projecting from a surface on a side opposed to the lower mount rubber 69 in the axis direction. In the example shown in the figure, the diameter of the distal end of the projecting section 63E is formed to be large to further suppress the position of the cover plate 63 with respect to the lower mount rubber 69 from deviating. The lower mount rubber 69 includes, on the end face 69F on the wheel side, a receiving section 69I, which is a recess, configured to receive the projecting section 63E of the cover plate 63.

Although not explained above, in FIG. 6A, the lower mount rubber 69 and the holding section 69G are integrally formed. However, naturally, the lower mount rubber 69 and the holding section 69G may be formed as separate bodies and fixed to each other. Similarly, the cover plate 63 is formed integrally with the projecting section 63D (see FIG. 6B) or the projecting section 63E (see FIG. 6C) or may be formed as separate bodies and fixed to each other.

<Others>

The embodiment can be grasped as a manufacturing method for a suspension device including a piston rod including a projecting part projecting from a cylinder of a shock absorber, an elastic member provided around the projecting part of the piston rod, and a transmitting member provided around the projecting part of the piston rod and configured to transmit a shock received by the piston rod to the elastic member, the manufacturing method including: restricting the transmitting member from being displaced with respect to the elastic member with a restricting mechanism, which is included in the elastic member and/or the transmitting member, configured to restrict the transmitting member from being displaced with respect to the elastic member in a state in which the piston rod is not arranged inside the elastic member and the transmitting member; and inserting the piston rod into the transmitting member restricted from being displaced with respect to the elastic member by the restricting mechanism and fixing the transmitting member around the projecting part in the piston rod.

The embodiment can be grasped as a manufacturing method for a suspension support including an elastic member provided around a projecting part of a piston rod, the projecting part projecting from a cylinder of a shock absorber; and a transmitting member configured to transmit, to the elastic member, a shock received by the piston rod provided around the projecting part of the piston rod, the manufacturing method including: restricting the transmitting member from being displaced with respect to the elastic member with a restricting mechanism, which is included in the elastic member and/or the transmitting member, configured to restrict the transmitting member from being displaced with respect to the elastic member in a state in which the piston rod is not arranged inside the elastic member and the transmitting member; and inserting the piston rod into the transmitting member restricted from being displaced with respect to the elastic member by the restricting mechanism and fixing the transmitting member around the projecting part in the piston rod.

What is claimed is:

1. A suspension device comprising:
   a cylinder configured to store fluid therein;
   a piston configured to divide an inside of the cylinder and arranged to be capable of sliding on the inside of the cylinder;
   a piston rod configured to support the piston and including a projecting part that projects from one end of the cylinder to an outside of the cylinder;
   an elastic member provided around the projecting part of the piston rod;
   a transmitting member including a first member provided around the projecting part of the piston rod and provided further on a cylinder side than the elastic member in an axis direction of the piston rod and a second member provided around the projecting part of the piston rod and provided on an opposite side of the first member across the elastic member in the axis direction, the transmitting member configured to hold the elastic member from both sides in the axis direction with the first member and the second member and transmit a shock received by the piston rod to the elastic member;
   a supporting member, which is a cylindrical member inserted into the elastic member, configured to support the projecting part of the piston rod, arranged to be held between the first member and the second member in the axis direction to set a distance in the axis direction between the first member and the second member to a predetermined distance, and pressed by the transmitting member when the first member or the second member receives a shock from the piston rod; and an attachment member attached to a vehicle body side, wherein the elastic member includes a restricting mechanism configured to restrict the first member from being displaced with respect to the elastic member in a state in which the piston rod is not arranged inside the elastic member and the first member, the first member is fixed around the projecting part in the piston rod in a state in which the piston rod is arranged inside the first member, the elastic member includes a first elastic body arranged further on the cylinder side than the attachment member, and a second elastic body provided separately from the first elastic body and provided on an opposite side of the first elastic body across the attachment member, and the first elastic body is configured to contact the second member.

2. The suspension device according to claim 1, wherein the restricting mechanism includes a groove provided to extend in a circumferential direction on an inner circumferential surface of the elastic member and configured to hold an outer circumferential section of the first member.

3. The suspension device according to claim 1, wherein the supporting member is separated from an inner circumferential surface of the elastic member in a state in which the supporting member is inserted into the elastic member.

4. The suspension device according to claim 1, wherein the first member includes, in a center thereof, an insertion hole for inserting the projecting part of the piston rod and the first member is fixed to the piston rod with the insertion hole in a state in which the projecting part is inserted into the insertion hole and the second member is not fixed to the piston rod.

5. The suspension device according to claim 4, wherein the insertion hole of the first member includes a taper section, a diameter of which increases toward the piston supported by the piston rod in the axis direction of the piston rod.

6. The suspension device according to claim 1, further comprising:

a bump rubber that is separately provided from the elastic member and is provided further on the cylinder side than the elastic member in the axis direction of the piston rod.

7. A suspension support comprising:

an elastic member provided around a projecting part of a piston rod, the projecting part projecting from a cylinder of a shock absorber;

a transmitting member including a first member provided around the projecting part of the piston rod and provided further on a cylinder side than the elastic member in an axis direction of the piston rod and a second member provided around the projecting part of the piston rod and provided on an opposite side of the first member across the elastic member in the axis direction, the transmitting member configured to hold the elastic member from both sides in the axis direction with the first member and the second member and transmit a shock received by the piston rod to the elastic member;

a supporting member, which is a cylindrical member inserted into the elastic member, configured to support the projecting part of the piston rod, arranged to be held between the first member and the second member in the axis direction to set a distance in the axis direction between the first member and the second member to a predetermined distance, and pressed by the transmitting member when the first member or the second member receives a shock from the piston rod; and an attachment member attached to a vehicle body side, wherein the elastic member includes a restricting mechanism configured to restrict the first member from being displaced with respect to the elastic member in a state in which the piston rod is not arranged inside the elastic member and the first member, the first member is fixed around the projecting part in the piston rod in a state in which the piston rod is arranged inside the first member, the elastic member includes a first elastic body arranged further on the cylinder side than the attachment member, and a second elastic body provided separately from the first elastic body and provided on an opposite side of the first elastic body across the attachment member, and the first elastic body is configured to contact the second member.

8. The suspension support according to claim 7, further comprising:

a bump rubber that is separately provided from the elastic member and is provided further on the cylinder side than the elastic member in the axis direction of the piston rod.

* * * * *